United States Patent Office 3,517,096
Patented June 23, 1970

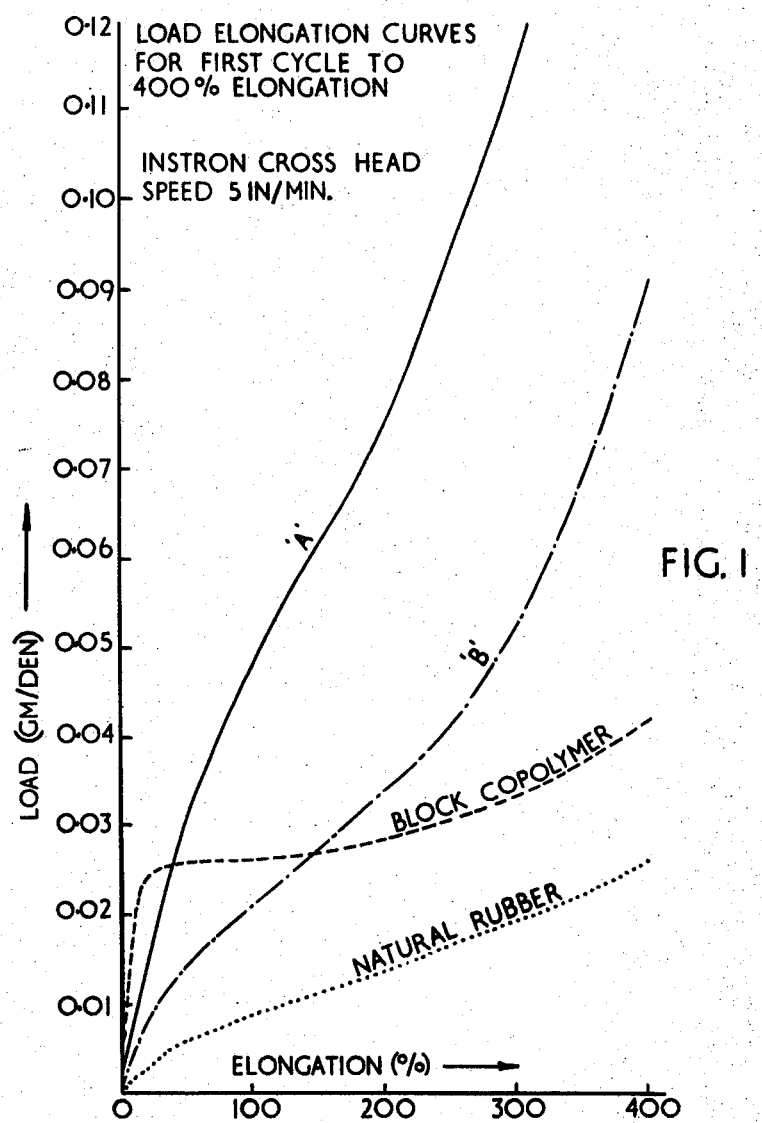

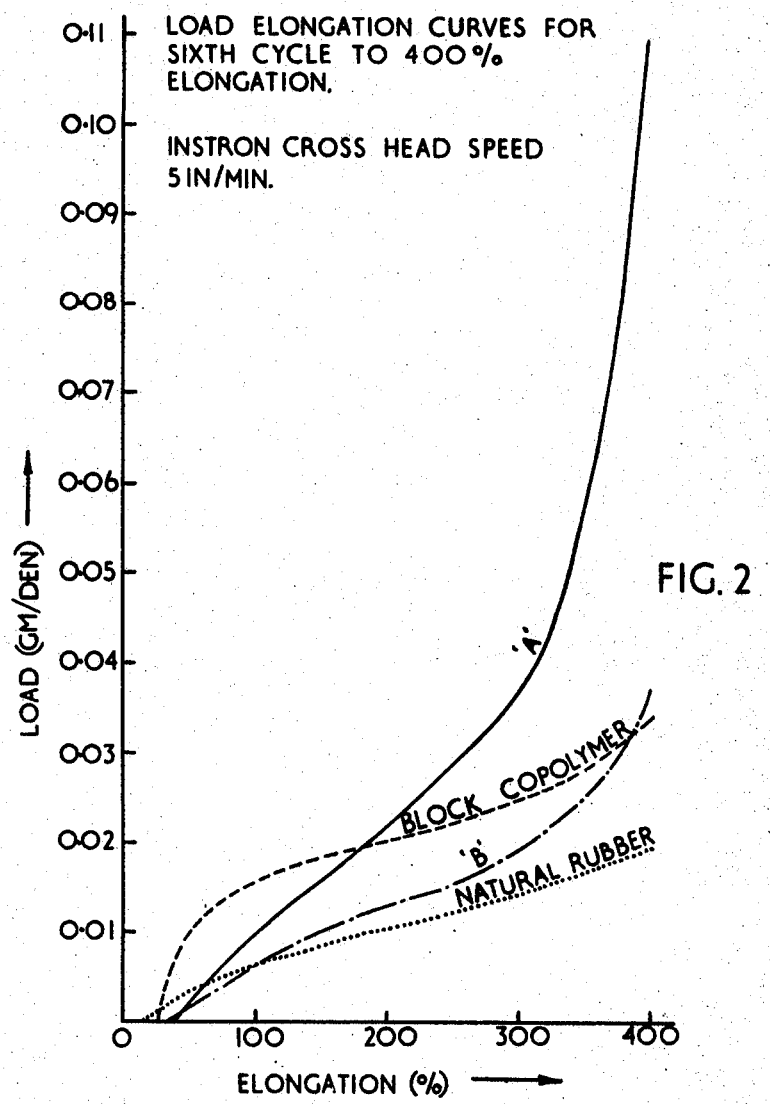

3,517,096
SPINNING OF PLASTICIZED ELASTOMERIC BLOCK COPOLYMER
John O. Wood, Tamworth, and Philip B. Young, Birmingham, England, assignors to The Dunlop Company Limited, London, England, a British company
Filed Aug. 28, 1967, Ser. No. 663,627
Claims priority, application Great Britain, Sept. 6, 1966, 39,673/66
Int. Cl. D01f 7/02
U.S. Cl. 264—176                    7 Claims

ABSTRACT OF THE DISCLOSURE

A process for producing an elastic thread from a thermoplastic block copolymer having the general formula $A-(B-A)_n$ in which A represents a non-elastomeric polymer block, B represents an elastomeric polymer block and $n$ is an integer of from 1 to 10, comprising incorporating a solvent for the block copolymer therein in an amount sufficient only to plasticize the block copolymer, and spinning the plasticized block copolymer through a spinneret to obtain an elastic thread.

---

This invention relates to the production of elastic threads and is concerned with elastic threads made from the materials known as thermoplastic rubbers.

Elastic thread may be produced by a variety of methods depending on the nature of the thread concerned. One general method involves the use of melt spinning techniques which can only be employed if the viscosity of the melt can be kept sufficiently low. A variation of this method involves the incorporation of a solvent in the material being spun and the spinning of the mass through a spinneret. This method has been described as a semi-melt spinning technique.

Thermoplastic rubbers have recently become available which can generally be described as thermoplastic block copolymers. These are materials having the general formula $A-(B-A)_n$ in which A represents a non-elastomeric polymer block, B represents an elastomeric polymer block and $n$ is an integer of from 1 to 10. In such a block copolymer, A may represent a polymer block having a second order transition temperature greater than 25° C. and having a number average molecular weight in the range of 200 to 100,000 while B may be an elastomeric polymer block having a number average molecular weight in the range of 25,000 to 1,000,000 and a glass transition below 10° C. Polymer block A may be a polymer of one or more monovinyl aromatic hydrocarbons, such as styrene, which is preferred, vinyl toluene, vinylxylene, ethylvinyl benzene, isopropyl styrene, ethylvinyl toluene, tert-butyl styrene or diethyl styrene or copolymers of at least 70 percent by weight of one or more of such monovinyl aromatic hydrocarbons and not more than 30 percent by weight of alpha-methyl styrene or esters of acrylic or methacrylic acid such as methyl methacrylate. Polymer block B may be formed from a conjugated diolefine such as butadiene, which is preferred, isoprene, methyl isoprene or copolymers of the butadiene-styrene type or butadiene acrylonitrile.

These thermoplastic rubbers may have high softening temperatures and thus cannot be prepared in the form of a melt. In other words, some of them are unprocessable by melt spinning techniques to produce elastic threads, but if such elastic threads can be obtained they will be strong and very elastic.

According to the present invention, there is provided a process for producing an elastic thread from a thermoplastic block copolymer having the general formula $A-(B-A)_n$ in which A represents a non-elastomeric polymer block, B represents an elastomeric polymer block and $n$ is an integer of from 1 to 10 comprising incorporating a solvent for the block copolymer therein in an amount sufficient only to plasticize the block copolymer and spinning the plasticized block copolymer through a spinneret to obtain an elastic thread.

The proportion of solvent which is incorporated in the copolymer may vary. The copolymer is not dissolved in the solvent in the sense that a solution of the copolymer is produced therein. The function of the solvent is more that of a plasticizer to enable the thermoplastic block copolymer mass to be extruded at relatively low temperatures and pressures. In the case where the solvent is methyl ethyl ketone, as mentioned hereinafter, a preferred proportion of solvent to thermoplastic block copolymer is between 25 and 65 parts by weight per 100 parts by weight of copolymer, while a more preferred proportion is between 35 and 50 parts by weight per 100 parts by weight of copolymer.

One desirable quality of a solvent employed in the invention is that it can easily be removed from the thread obtained by water treatment.

The polymer blocks of the block copolymers employed in this invention may have the molecular weights and transition temperatures as stated hereinbefore. However, it is to be understood also that the invention is not concerned with thermoplastic block copolymers which can be extruded in the form in which they are ordinarily prepared. Thus, Thermoplastic 125 made by Shell Chemicals Inc. of the United States of America is an oil-extended thermoplastic block copolymer made from butadiene and styrene. It has been found that this material can readily be extruded to form an elastic thread without the addition of any separate solvent thereto. However, an unextended thermoplastic block copolymer, such as one having an A—B—A structure in which the A blocks are of polystyrene with a second order transition temperature of about 60° C. and a number average molecular weight of 18,900 and the B blocks are of polybutadiene with a second order transition temperature of about —80° C. and a number average molecular weight of 102,200, is too intractable to be melt-spun without being prepared by the method of the present invention.

Generally speaking, the ranges of temperatures which may be used present no critical features. Thus, many results were obtained by spinning within a temperature range lying between 80° C. and 150° C. and the aforementioned unextended block copolymer, when plasticized, can also be spun at temperatures lying in the range of 30° to 100° C.

It has been found that methyl ethyl ketone is particularly useful as a solvent for the purposes of the present invention. Ethylene dichloride gives indifferent results while toluene and S.B.P. 3 petrol fraction, which has a boiling range of 102° C. in which 70 percent of the fraction comes off below 110° C., give very poor results. Without wishing to commit ourselves to any theoretical explanation as to the reasons for the effectiveness of different solvents it is believed that it may be possible to explain their behaviour on the basis of the modern Doolittle Theory of Plasticizer Action. For a plasticizer to function, a polymer must offer two kinds of active sites one of which can be solvated and another which cannot. A thermoplastic block copolymer is wholly amorphous with its different segments soluble in different oragnic solvents. If the active sites represented by one type of block are extended by one plasticizer with no effect on the other type of active site, one range of behaviour can be expected. On the other hand, in the presence of a different solvent the active sites repersented by the other type of block may be extended and a different range of behaviour is then obtained. It is possible that the different effects obtained by different solvents in the practice of the present invention are due to the different reactions of the blocks of the thermoplastic polymers to different solvents.

Threads of the unextended block copolymer mentioned above were prepared by absorbing varying quantities of ethylene dichloride therein in quantities ranging from 10 to 100 parts by weight of ethylene dichloride for every 100 parts by weight of block copolymer. In some instances a rough thread was obtained. With the greater proportions of ethylene dichloride a smooth thread was produced, while in some instances the appearance of the thread was spiral.

When a similar series of tests were conducted using toluene and the S.B.P. 3 petrol fraction it was only possible to obtain rough threads. However, when tests were conducted with varying quantities of methyl ethyl ketone it was possible to obtain a smooth thread of excellent appearance. The optimum quantity of solvent was 50 cc. per 100 grams of block copolymer. As the quantity of the solvent decreased there was a tendency for the appearance of the thread to diminish in quality.

The invention is illustrated by the following example:

EXAMPLE 100 grams of the unextended thermoplastic block copolymer referred to above were placed in a tin together with 50 cc. of methyl ethyl ketone. The tin was tightly lidded and rolled at 60 r.p.m. for four hours. Upon examination of the particles of thermoplastic polymer it was found that they retained their discrete form but had been transformed from hard, tough rubbery masses into soft, cheese-like lumps which would disintegrate between the fingers. The plasticized polymer was then extruded into a thread by an appropriate melt spinning technique. The temperature of spinning was between 30° C. and 80° C.

The thread obtained had an excellent appearance and could readily be spun into water to remove the solvent therefrom.

Tests were carried out on this thread including tensile and load-extension cycles on an Instron tester, the latter test being six cycles to 400 percent elongation. The results of the load-extension cycles are shown in FIGS. 1 and 2 and, for purposes of comparison, curves are also shown in these figures for natural rubber, and for two commercially available spandex threads which are designated A and B for convenience. FIG. 1 is the first extension curve while FIG. 2 is the last extension curve. The denier of the various matreials is set forth below in the table:

TABLE

| Material: | Denier |
|---|---|
| Natural rubber (40's count) | 2880 |
| Thermoplastic block copolymer | 2020 |
| A | 1840 |
| B | 1280 |

It will be seen from FIGS. 1 and 2 that the stress generated in the block copolymer at a given applied extension compares very favourably with natural rubber on the first load cycle and on the sixth appears to be superior to both natural rubber and spandex thread B. Under certain circumstances the flatter block copolymer curve, above an initial elongation of about 50 percent, may be more desirable than the rapid rise of stress with applied elongation exhibited by the spandex thread A. By comparing FIG. 1 with FIG. 2 it may be seen that the block copolymer has taken up less permanent stretch after six cycles than either of the spandex threads.

FIGS. 1 and 2 are obtained with an Instron crosshead speed 5 inch/min. Using a speed of 2 inch/min. the breaking loads of the various threads were compared and it was found that that of the thread of the invention was only slightly lower than that of natural rubber of equivalent denier.

Having now described our invention, what we claim is:

1. A process for producing an elastic thread from a thermoplastic block copolymer having the general formula A—(B—A)$_n$ in which A represents a non-elastomeric monovinyl monoaryl hydrocarbon polymer block, B represents an elastomeric conjugated diolefine polymer block and $n$ is an integer of from 1 to 10, said non-elastomeric polymer block having a second order transition temperature greater than 25° C. and having a number average molecular weight in the range of 200 to 100,000 and said elastomeric polymer product having a number average molecular weight in the range of 25,000 to 1,000,000 and a glass transition temperature below 10° C., comprising incorporating 25–65 parts by weight of a solvent selected from the grou pconsisting of methyl ethyl ketone and ethylene dichloride in the block copolymer per 100 parts by weight thereof to only plasticize the block copolymer, and spinning the plasticized block copolymer through a spinneret to obtain an elastic thread.

2. A method according to claim 1 wherein said monovinyl monoaryl hydrocarbon is selected from the group consisting of styrene, vinyl toluene, vinylxylene, ethylvinyl benzene, isopropyl styrene, ethylvinyl toluene, tert-butyl styrene and diethyl styrene.

3. A process according to claim 1 in which polymer block A is a polymer of styrene.

4. A process according to claim 1 in which the conjugated diolefine is butadiene.

5. A process according to claim 1 in which the proportion of solvent to thermoplastic block copolymer is between 35 and 50 parts by weight per 100 parts by weight of copolymer.

6. A process according to claim 1 in which the temperature of spinning is between 30° C. and 150° C.

7. A process according to claim 1 in which the temperature of spinning is between 30° C. and 100° C.

References Cited

UNITED STATES PATENTS

| 3,265,765 | 8/1966 | Holden et al. | |
| 3,415,921 | 12/1968 | McFarren. | |
| 2,955,907 | 10/1960 | Kolb | 264—184 |
| 3,033,806 | 5/1962 | Spencer | 264—53 |
| 3,055,730 | 9/1962 | Robinson et al. | 264—184 |

OTHER REFERENCES

Ferrigno: "Rigid Plastics Foams" (pp. 139–141 and 148–189), Reinhold Pub. Co., New York, 1963.

JULIUS FROME, Primary Examiner

H. MINTZ, Assistant Examiner

U.S. Cl. X.R.

260—879, 880; 264—205, 211